(12) United States Patent
Goldfarb et al.

(10) Patent No.: US 12,328,588 B2
(45) Date of Patent: Jun. 10, 2025

(54) SYSTEM AND METHOD FOR IMSI CATCHING IN 5G NETWORKS

(71) Applicant: COGNYTE TECHNOLOGIES ISRAEL LTD., Herzliya Pituach (IL)

(72) Inventors: Eithan Goldfarb, Herzliya Pituach (IL); Guy Amitai, Herzliya Pituach (IL)

(73) Assignee: COGNYTE TECHNOLOGIES ISRAEL LTD. (IL)

( * ) Notice: Subject to any disclaimer, the term of this patent is extended or adjusted under 35 U.S.C. 154(b) by 525 days.

(21) Appl. No.: 17/715,582

(22) Filed: Apr. 7, 2022

(65) Prior Publication Data

US 2022/0338016 A1    Oct. 20, 2022

(30) Foreign Application Priority Data

Apr. 19, 2021  (IL) .......................................... 282449

(51) Int. Cl.
*H04W 12/80* (2021.01)
*H04W 4/021* (2018.01)
(Continued)

(52) U.S. Cl.
CPC ........... *H04W 12/80* (2021.01); *H04W 4/021* (2013.01); *H04W 8/20* (2013.01); *H04W 12/72* (2021.01); *H04W 60/04* (2013.01)

(58) Field of Classification Search
None
See application file for complete search history.

(56) References Cited

U.S. PATENT DOCUMENTS 10,863,353 B2 †  12/2020  Ainali
11,184,356 B1 *  11/2021  Tandon .................. H04L 67/141
(Continued)

FOREIGN PATENT DOCUMENTS

DE    102019114453 A1 *  12/2020  ............. G08B 25/10
EP       3576366            12/2019
(Continued)

OTHER PUBLICATIONS

Search Report—corresponding European Application No. 22168765, dated Sep. 13, 2022, 7 pages.
(Continued)

*Primary Examiner* — Adolf Dsouza
(74) *Attorney, Agent, or Firm* — ISUS INTELLECTUAL PROPERTY PLLC; Anthony Jason Mirabito

(57) ABSTRACT

System and method that uses a first transceiver and a second transceiver, and a processor. The processor is configured to cause a cellular device associated with the 5G cellular network to communicate, to the first transceiver, a 5G identifier used by the device to identify itself, using the first transceiver. The processor is further configured to ascertain a correspondence between the 5G identifier and a Subscription Permanent Identifier (SUPI), by communicating with a core network of the 5G cellular network via a lawful-interception (LI) communication interface of the core network. The processor is further configured to cause the cellular device to register with the second transceiver, in response to ascertaining the correspondence and to the 5G identifier having been communicated from the cellular device.

12 Claims, 4 Drawing Sheets

(51) Int. Cl.
*H04W 8/20* (2009.01)
*H04W 12/72* (2021.01)
*H04W 60/04* (2009.01)

(56) References Cited

U.S. PATENT DOCUMENTS 12,028,710 B2 * 7/2024 Lin ................. H04W 12/08
12,082,067 B2 * 9/2024 Stojanovski .......... H04W 36/32

FOREIGN PATENT DOCUMENTS

WO    WO-2020083516 A1 * 4/2020 ............. H04L 67/51
WO    2020143917    7/2020
WO    2021151497    8/2021

OTHER PUBLICATIONS

3GPP TR 33.809 V0.8.0 (Nov. 2019) 2019-11-xx Release 16 Technical Report of 3rd Generation Partnership Project; Technical Specification Group Services and System Aspects Study on 5G Security Enhancement against False Base Stations. The referenced version is Release 16 from Nov. 2019 version (33809-080), accessible at https://www.3gpp.org/ftp/Specs/archive/33_series/33.809/. On the List of versions at this link, this document is indicated as being dated Jan. 2, 2020 11:20 AM.†

\* cited by examiner
† cited by third party

SYSTEM AND METHOD FOR IMSI CATCHING IN 5G NETWORKS

FIELD OF THE DISCLOSURE

The present disclosure is related to the field of communication monitoring.

BACKGROUND OF THE DISCLOSURE

Interrogation devices that solicit cellular devices (also known as mobile communication terminals) by imitating the operation of a legitimate base station are sometimes referred to as International Mobile Subscriber Identity (IMSI) catchers. Examples of IMSI catching techniques are described, for example, in Strobel, "IMSI catcher," Chair for Communication Security, Ruhr-Universität Bochum 14 (2007), in Asokan et al., "Man-in-the-middle in tunneled authentication protocols," International Workshop on Security Protocols, Springer, Berlin, Heidelberg, 2003, and in Meyer et al., "On the impact of GSM encryption and man-in-the-middle attacks on the security of interoperating GSM/UMTS networks," 2004 IEEE 15th International Symposium on Personal, Indoor and Mobile Radio Communications (IEEE Cat. No. 04TH8754), Vol. 4, IEEE, 2004. The respective disclosures of the aforementioned references are incorporated herein by reference.

In $5^{th}$ generation (5G) cellular networks, an IMSI is known as a Subscription Permanent Identifier (SUPI).

U.S. Pat. No. 10,638,324 describes a method and fake base station for detecting subscriber identity. The method includes: capturing at least one wireless message containing an encrypted subscriber identity of a fifth generation mobile phone system transmitted from a mobile subscriber apparatus; transmitting a reject message of the fifth generation mobile phone system for the mobile subscriber apparatus; capturing at least one wireless message of the fourth generation mobile phone system transmitted from the mobile subscriber apparatus; detecting an unencrypted subscriber identity from the at least one captured wireless message of the fourth generation mobile phone system; and transmitting a disconnect message of the fourth generation mobile phone system for the mobile subscriber apparatus.

SUMMARY OF THE DISCLOSURE

There is provided, in accordance with some embodiments of the present invention, a system including a first transceiver, configured to imitate a $5^{th}$ generation (5G) base transceiver station (BTS) belonging to a 5G cellular network, a second transceiver, configured to imitate a lower-generation BTS belonging to a lower-generation cellular network, and a processor. The processor is configured to cause a cellular device associated with the 5G cellular network to communicate, to the first transceiver, a 5G identifier used by the device to identify itself, using the first transceiver. The processor is further configured to ascertain a correspondence between the 5G identifier and a Subscription Permanent Identifier (SUPI), by communicating with a core network of the 5G cellular network via a lawful-interception (LI) communication interface of the core network. The processor is further configured to cause the cellular device to register with the second transceiver, in response to ascertaining the correspondence and to the 5G identifier having been communicated from the cellular device.

In some embodiments, the processor is further configured to perform man-in-the-middle (MITM) intermediation of communication exchanged with the cellular device, subsequently to causing the cellular device to register with the second transceiver.

In some embodiments, the processor is further configured to cause the cellular device to behave as a beacon, subsequently to causing the cellular device to register with the second transceiver.

In some embodiments, the processor is configured to ascertain the correspondence by, subsequently to the cellular device communicating the 5G identifier to the first transceiver, communicating the 5G identifier to the core network via the LI communication interface such that the core network returns the SUPI via the LI communication interface.

In some embodiments, the processor is configured to cause the cellular device to register with the second transceiver in response to the SUPI being included in a predefined list of SUPIs.

In some embodiments,
the 5G identifier is a first 5G identifier and the correspondence is a first correspondence,
the processor is configured to cause the cellular device to communicate the first 5G identifier to the first transceiver while a person-of-interest (POI) and the cellular device are at a first location,
the processor is further configured to:
cause the cellular device to communicate a second 5G identifier to any transceiver while the POI and the cellular device are at a second location, and
by communicating the second 5G identifier to the core network, ascertain a second correspondence between the second 5G identifier and the SUPI, and
the processor is configured to cause the cellular device to register with the second transceiver in response to the SUPI corresponding both to the first 5G identifier and to the second 5G identifier.

In some embodiments, the processor is further configured to:
receive one or more other 5G identifiers from different respective other cellular devices,
by communicating the other 5G identifiers to the core network, ascertain one or more other SUPIs corresponding to the other 5G identifiers, respectively, and
store an association between the other 5G identifiers and the other SUPIs, respectively.

In some embodiments, the processor is configured to ascertain the correspondence by, prior to the cellular device communicating the 5G identifier to the first transceiver, communicating the SUPI to the core network via the LI communication interface such that the core network returns the 5G identifier via the LI communication interface.

In some embodiments, the processor is configured to communicate the SUPI to the core network in a subscription for push notifications of 5G identifiers corresponding to the SUPI.

In some embodiments, the 5G identifier includes a Global Unique Temporary Identifier (GUTI).

In some embodiments, the 5G identifier includes a Subscription Concealed Identifier (SUCI).

In some embodiments, the processor is configured to cause the cellular device to register with the second transceiver by communicating, to the cellular device, a message selected from the group of messages consisting of: a REGISTRATION REJECT message and a SERVICE REJECT message.

In some embodiments, the processor is further configured to, prior to causing the cellular device to communicate the 5G identifier to the first transceiver:

cause the cellular device to communicate a first other 5G identifier to any transceiver while a person-of-interest (POI) and the cellular device are at a first location, and to communicate a second other 5G identifier to any transceiver while the POI and the cellular device are at a second location, and by communicating the first other 5G identifier and the second other 5G identifier to the core network, ascertain that the SUPI corresponds both to the first other 5G identifier and to the second other 5G identifier, the processor being configured to cause the cellular device to register with the second transceiver in response to ascertaining that the SUPI corresponds both to the first other 5G identifier and to the second other 5G identifier.

There is further provided, in accordance with some embodiments of the present invention, a method, including, using a first transceiver imitating a $5^{th}$ generation (5G) base transceiver station (BTS) belonging to a 5G cellular network, causing a cellular device, which is associated with the 5G cellular network, to communicate, to the first transceiver, a 5G identifier used by the device to identify itself. The method further includes, by communicating with a core network of the 5G cellular network via a lawful-interception (LI) communication interface of the core network, ascertaining a correspondence between the 5G identifier and a Subscription Permanent Identifier (SUPI). The method further includes, in response to ascertaining the correspondence and to the 5G identifier having been communicated from the cellular device, causing the cellular device to register with a second transceiver imitating a lower-generation BTS belonging to a lower-generation cellular network.

There is further provided, in accordance with some embodiments of the present invention, a computer software product including a tangible non-transitory computer-readable medium in which program instructions are stored. The instructions, when read by a processor, cause the processor to cause a cellular device, which is associated with the 5G cellular network, to communicate, to the first transceiver, a 5G identifier used by the device to identify itself, using a first transceiver imitating a $5^{th}$ generation (5G) base transceiver station (BTS) belonging to a 5G cellular network. The instructions further cause the processor to ascertain a correspondence between the 5G identifier and a Subscription Permanent Identifier (SUPI), by communicating with a core network of the 5G cellular network via a lawful-interception (LI) communication interface of the core network. The instructions further cause the processor to cause the cellular device to register with a second transceiver imitating a lower-generation BTS belonging to a lower-generation cellular network, in response to ascertaining the correspondence and to the 5G identifier having been communicated from the cellular device.

The present disclosure will be more fully understood from the following detailed description of embodiments thereof, taken together with the drawings, in which:

DETAILED DESCRIPTION OF EMBODIMENTS

Overview

Figure 1:
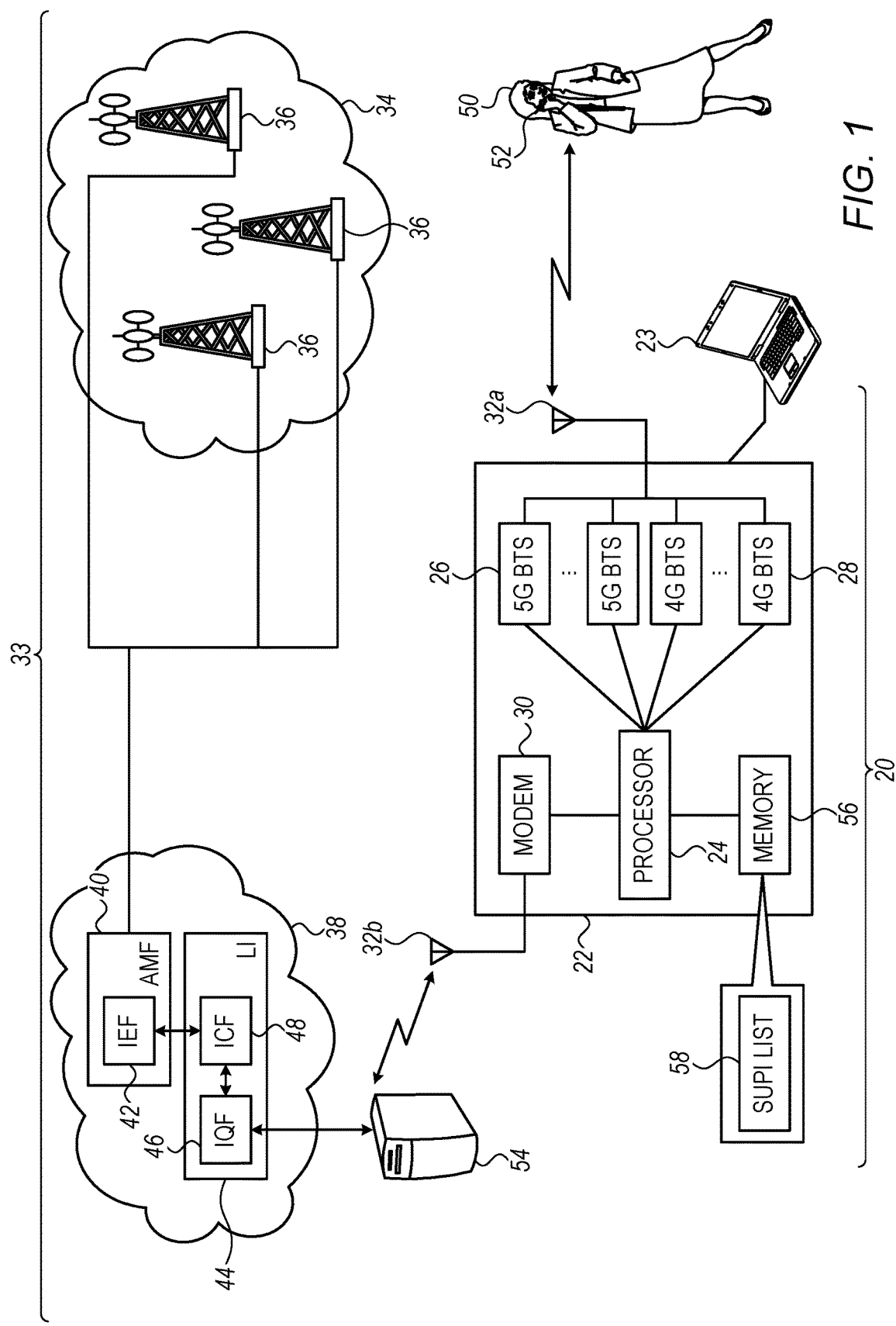
FIG. 1 is a schematic illustration of a system for lawful interception, in accordance with some embodiments of the present disclosure.

In some cases, lawful interception (LI) of a device belonging to a person-of-interest (POI) may be desired. However, due to enhanced security measures in 5G cellular communication, advanced interrogation and interception techniques, such as causing the device to behave as a beacon or man-in-the-middle (MITM) intermediation of communication exchanged with the device, may be impossible to perform in 5G.

Hypothetically, an interrogation device could cause the cellular device of the POI to register with a lower-generation (e.g., 4G or 3G) imitation base transceiver station (BTS) belonging to the interrogation device, so as to enable advanced interrogation and/or interception of the cellular device. However, per the 5G protocol, a cellular device does not transfer its unencrypted SUPI when identifying itself; rather, the device transfers only another 5G identifier such as a Global Unique Temporary Identifier (GUTI) or a Subscription Concealed Identifier (SUCI). Hence, even if the SUPI of the POI is known in advance, identifying the device of the POI may be difficult. One solution is to cause all solicited cellular devices to register with the lower-generation imitation BTS, and to extract the SUPI of each device until the SUPI of the POI is found. However, this solution would entail disturbing a large number of users of the 5G cellular network.

To address this challenge, embodiments of the present disclosure query the LI communication interface of the 5G core network to help pinpoint the devices having a relatively high likelihood of belonging to POIs.

For example, each GUTI, SUCI, or other 5G identifier received from a solicited cellular device may be passed to the LI interface in a query, such that the LI interface returns the corresponding SUPI in response. If the SUPI is included in a list of SUPIs-of-interest, each of which is considered to have a relatively high likelihood of belonging to a POI, the solicited device may be caused to register with the lower-generation imitation BTS. Otherwise, the solicited device may be released.

Alternatively, the LI interface may be queried for other 5G identifiers corresponding to the SUPIs-of-interest. Subsequently, if a 5G identifier received from a solicited device matches one of the 5G identifiers received from the LI interface, the device may be caused to register with the lower-generation imitation BTS. Otherwise, the device may be released.

In some embodiments, to identify the SUPIs-of-interest, each POI is tracked as the POI passes through multiple locations. As the POI passes through each location, multiple 5G identifiers are received from solicited cellular devices, and the corresponding SUPIs are identified by querying the 5G core network as described above. Any SUPI identified at all of the locations is then designated as a SUPI-of-interest. Subsequently to identifying such a SUPI, the cellular device using the SUPI may be immediately caused to register with the lower-generation imitation BTS. Alternatively or additionally, the SUPI may be saved to a list of SUPIs-of-interest, and the cellular device may be caused to register with the lower-generation imitation BTS at a later time, using any of the techniques described above.

Embodiments of the present disclosure may also be applied to cases in which it is desired to identify the SUPI of any cellular device located in a particular area, such as in search-and-rescue and presence-detection (e.g., perimeter-control) operations.

System Description

Reference is initially made to FIG. 1, which is a schematic illustration of a system 20 for lawful interception (LI), in accordance with some embodiments of the present disclosure.

FIG. 1 depicts a 5G cellular network 33 including a radio access network (RAN) 34 and a core network 38. RAN 34 includes one or more 5G base transceiver stations (BTSs) 36, each of which is wiredly connected to the Access and Mobility Management Function (AMF) 40 of core network 38. Typically, AMF 40 includes an Identifier Event Function (IEF) 42, further described below. In addition to AMF 40, the core network includes an LI communication interface 44, which is further described below, along with other functions not shown in FIG. 1, such as a Unified Data Management (UDM) function.

System 20 comprises one or more (typically, multiple) interrogation devices 22. Each interrogation device 22 typically comprises a processor 24, one or more first transceivers 26, one or more second transceivers 28, a modem 30, a memory 56, a first antenna 32a, and a second antenna 32b. Each first transceiver 26 is configured to imitate a 5G BTS 36, and thus, may be referred to as a 5G imitation BTS. Each second transceiver 28 is configured to imitate a 4G BTS or any other lower-generation (e.g., 3G or 2G) BTS belonging to a lower-generation cellular network, and thus, may be referred to as a lower-generation imitation BTS.

Memory 56 may comprise a volatile memory, such as a random access memory (RAM), and/or a non-volatile memory, such as a flash memory. In some cases, memory 56 stores a predefined list 58 of one or more SUPIs, referred to herein as SUPIs-of-interest. Each SUPI in list 58 is typically known to belong to, or at least has a relatively high likelihood of belonging to, a person-of-interest (POI) 50, who is of interest to the operator of system 20.

Using first antenna 32a and first transceivers 26, processor interrogates cellular devices 52 associated with cellular network 33, i.e., the processor causes device 52 to communicate with the first transceivers as if the first transceivers were legitimate 5G BTSs 36 belonging to the network. To begin an interrogation, the processor solicits the cellular device, i.e., the processor causes the cellular device to associate with a first transceiver of the interrogation device. For example, the processor may transmit a signal at a relatively high power level and/or using directional transmission from first antenna 32a, such that the signal is received by the device with a signal strength that is greater than that of any signal received from a legitimate BTS. In response to receiving the greater-strength signal, the cellular device may associate with the first transceiver.

By interrogating cellular devices 52, the processor may cause each device to communicate, to a first transceiver, a 5G identifier, such as a Global Unique Temporary Identifier (GUTI) or a Subscription Concealed Identifier (SUCI), used by the device to identify itself. Subsequently, the processor may receive the 5G identifier from the first transceiver.

In addition, using modem 30 and second antenna 32b, processor may communicate with core network 38 via LI communication interface 44. By performing this communication, the processor may ascertain a correspondence between a SUPI and any other 5G identifier.

For example, the processor may query the LI communication interface for a SUPI corresponding to a SUCI or GUTI received from a device. Subsequently, in response to receiving the SUPI from the LI communication interface, the processor may ascertain that the SUCI corresponds to the SUPI by virtue of encrypting the SUPI, or that the GUTI corresponds to the SUPI by virtue of having been assigned to the SUPI by the core network. Conversely, the processor may query the LI communication interface for a GUTI or SUCI corresponding to a given SUPI. Such a query may include a subscription for push notifications of corresponding 5G identifiers, such that, for example, each time a new GUTI is assigned to the SUPI, the processor receives the GUTI.

Typically, system 20 further comprises a server 54, and communication between the core network and each of the interrogation devices is conducted via server 54.

In response to ascertaining a correspondence between a SUPI and another 5G identifier received from a cellular device, the processor may cause the cellular device to register with any one of second transceivers 28. For example, the processor may communicate a REGISTRATION REJECT or SERVICE REJECT message to the device, e.g., specifying 5G Mobility Management (5GMM) cause #7, #11, #12, #13, #27, #28, #67, or #68. The REGISTRATION REJECT and SERVICE REJECT messages are described, for example, in Technical Specification (TS) #24.501 of the 3rd Generation Partnership Project (3GPP), whose disclosure is incorporated herein by reference.

Subsequently to causing the cellular device to register with a second transceiver, the processor may perform any advanced interrogation and/or interception techniques, which cannot be performed in 5G, on the cellular device. For example, the processor may cause the device to behave as a beacon so as to facilitate tracking the device, and/or perform man-in-the-middle (MITM) intermediation of communication exchanged with the device.

Typically, LI communication interface 44 includes an Identifier Query Function (IQF) 46 and an Identifier Caching Function (ICF) 48. Processor 24 may query the core network for a first 5G identifier (such as a SUPI) corresponding to a second 5G identifier (such as a GUTI or a SUCI) by passing the second 5G identifier (directly, or via server 54) to IQF 46. IQF 46 may then pass the second 5G identifier to ICF 48, which may then pass the second 5G identifier to IEF 42. In response to the query, IEF 42 may return the first 5G identifier to ICF 48, and the first 5G identifier may subsequently be communicated to IQF 46 and then (directly, or via server 54) to processor 24. Further details regarding the LI communication interface are provided, for example, in TS #33.127 of the 3GPP, whose disclosure is incorporated herein by reference.

Typically, each interrogation device comprises multiple first transceivers 26, so as to facilitate simultaneous 5G interrogation of multiple devices 52. Each interrogation device may further comprise multiple second transceivers 28, so as to facilitate simultaneous advanced lower-generation interrogation and/or interception of multiple devices.

In some embodiments, each interrogation device further comprises an input interface, such as a keyboard, and/or an output interface, such as a computer monitor. Alternatively or additionally, the interrogation device may be connected (e.g., via a Universal Serial Bus (USB) cable) to an auxiliary device 23 comprising suitable input and output interfaces.

In general, processor 24 may be embodied as a single processor, or as a cooperatively networked or clustered set of processors. The functionality of processor 24 may be implemented solely in hardware, e.g., using one or more fixed-function or general-purpose integrated circuits, Application-Specific Integrated Circuits (ASICs), and/or Field-Programmable Gate Arrays (FPGAs). Alternatively, this functionality may be implemented at least partly in software. For example, processor 24 may be embodied as a programmed processor comprising, for example, a central processing unit (CPU) and/or a Graphics Processing Unit (GPU). Program code, including software programs, and/or data may be loaded for execution and processing by the CPU and/or GPU. The program code and/or data may be downloaded to the processor in electronic form, over a network, for example. Alternatively or additionally, the program code and/or data may be provided and/or stored on non-transitory tangible media, such as magnetic, optical, or electronic memory. Such program code and/or data, when provided to the processor, produce a machine or special-purpose computer, configured to perform the tasks described herein.

Identifying SUPIs of Interest

Figure 2:
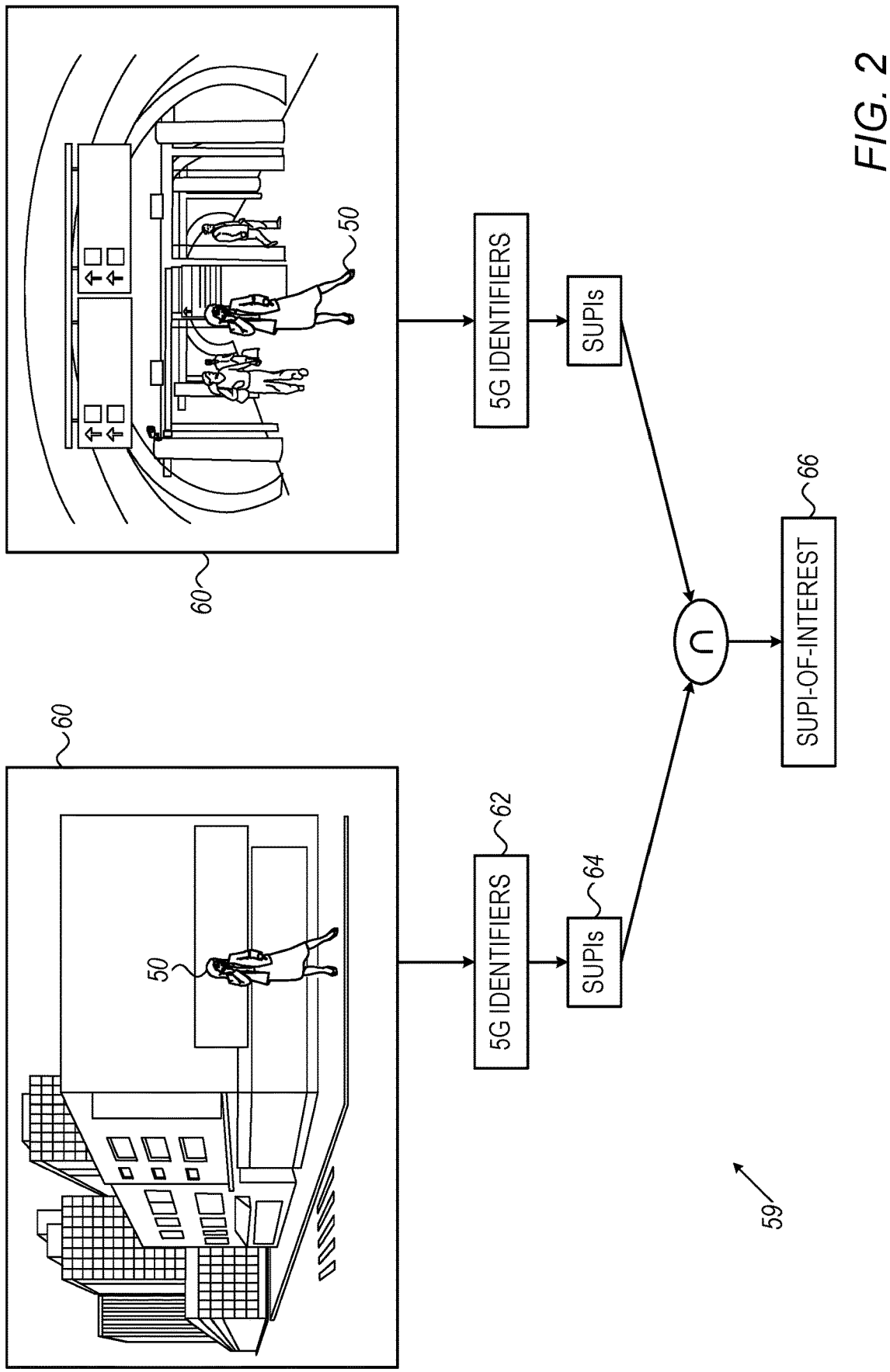
FIG. 2 is a schematic illustration of a technique for identifying a SUPI-of-interest using one or more interrogation devices, in accordance with some embodiments of the present disclosure.

Reference is now made to FIG. 2, which is a schematic illustration of a technique 59 for identifying a SUPI-of-interest 66 using one or more interrogation devices, in accordance with some embodiments of the present disclosure.

In some cases, a SUPI-of-interest belonging to a POI 50 may be known a priori. In such cases, the SUPI-of-interest may be input to processor 24 using any suitable input interface, such as a keyboard belonging to auxiliary device 23 (FIG. 1).

In many cases, however, the SUPI of the POI is not known a priori. In such cases, typically, respective interrogation devices are placed at multiple locations 60 through which the POI is expected to pass. (Each location may have any arbitrary size.) Upon the POI entering any one of locations 60, cellular devices at the location are interrogated by the interrogation device at the location, such that the interrogation device receives a group 62 of 5G identifiers from the location. In other embodiments, a single interrogation device follows the POI and interrogates at each of the locations while the POI is at the location, such that the interrogation device receives respective groups 62 from the locations.

The one or more interrogation devices further ascertain the SUPI to which each received 5G identifier corresponds. In particular, each 5G identifier in each group 62 is communicated, in a query, to the 5G core network (via the LI interface), such that the core network returns the corresponding SUPI. The interrogation devices thus obtain a respective group 64 of SUPIs for each of the locations.

Subsequently, a processor of one of the interrogation devices or of a separate server (such as server 54 of FIG. 1) computes the intersection of groups 64. The processor thus identifies any SUPI that is included in all of the groups and thus corresponds to a respective 5G identifier received from each of the locations. Each such SUPI is designated as a SUPI-of-interest 66.

(If a single SUPI-of-interest is identified, the SUPI-of-interest may be assumed to belong to the POI. Otherwise, each identified SUPI-of-interest may be assumed to have a relatively high likelihood of belonging to the POI. For example, if three SUPIs-of-interest are identified, each may be assumed to have a ⅓ chance of belonging to the POI.)

Subsequently to identifying a SUPI-of-interest, the interrogation device at the location of the POI may cause the cellular device using the SUPI-of-interest to register with a lower-generation imitation BTS, as described above with reference to FIG. 1. Alternatively or additionally, the SUPI-of-interest may be added to list 58 (FIG. 1), and the registering with the lower-generation imitation BTS may be performed at a later time, as further described below with reference to FIGS. 3-4.

In some cases, a received SUPI, even if it is not of interest, may be associated with its corresponding other 5G identifier in memory 56 (FIG. 1). By storing such associations, the system may reduce the need for future queries to the core network.

Interrogation Algorithms

Figure 3:
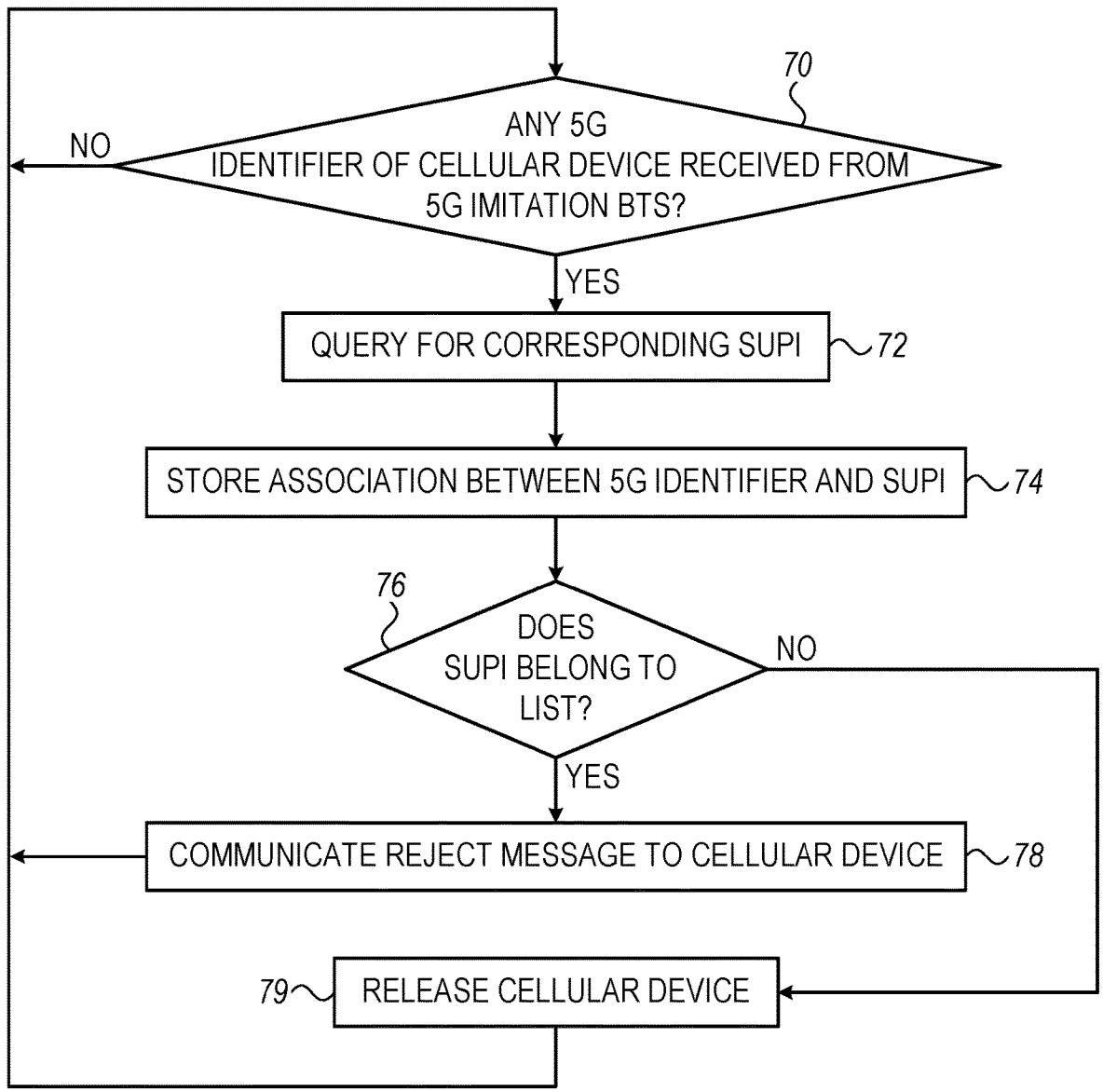
FIGS. 3-4 are flow diagrams for algorithms for interrogating cellular devices, in accordance with some embodiments of the present disclosure.

Reference is now made to FIG. 3, which is a flow diagram for an algorithm 68 for interrogating cellular devices, in accordance with some embodiments of the present disclosure. Algorithm 68 may be executed by the processor of any interrogation device at any suitable location. Prior to executing algorithm 68, list 58 (FIG. 1) is defined, e.g., using technique 59 (FIG. 2) for one or more POIs.

Per algorithm 68, the processor repeatedly checks, at an identifier-seeking step 70, whether any 5G identifier of a cellular device was received from a 5G imitation BTS. For each received 5G identifier, the processor, at a first querying step 72, queries the 5G core network (via the LI interface) for the corresponding SUPI, such that the core network returns the SUPI (via the LI interface) to the processor. Optionally, the processor may then store, in memory 56 (FIG. 1), an association between the 5G identifier and the SUPI at a storing step 74, thus potentially reducing the need for future queries to the core network.

Subsequently, the processor checks, at a first checking step 76, whether the SUPI belongs to the predefined list of SUPIs-of-interest. If yes, the processor, at a rejecting step 78, communicates a REGISTRATION REJECT or SERVICE REJECT message to the device, thus causing the device to register with a transceiver imitating a lower-generation BTS. Otherwise, the processor releases the cellular device at a releasing step 79, such that the cellular device reassociates with a legitimate 5G BTS. Subsequently to rejecting step 78 or releasing step 79, the processor returns to identifier-seeking step 70.

A variation of algorithm 68 may be executed in other scenarios in which there is no predefined list of SUPIs-of-interest, such as in search-and-rescue or presence-detection operations. Per this variation, first checking step 76 is not performed. Rather, following storing step 74 (or first querying step 72), the processor outputs the SUPI received from the core network in response to the processor's query. For example, the processor may display the SUPI on a monitor belonging to auxiliary device 23 (FIG. 1). Subsequently, in response to instructions from a user, the processor may release the cellular device or, alternatively, perform rejecting step 78.

For example, in a search-and-rescue operation, following the output of the SUPI, a user of the system may ascertain that the SUPI may belong to the device of a missing person. In response thereto, the user may instruct the processor to track the device. The processor may therefore perform rejecting step 78, and then cause the device to behave as a beacon.

Figure 4:
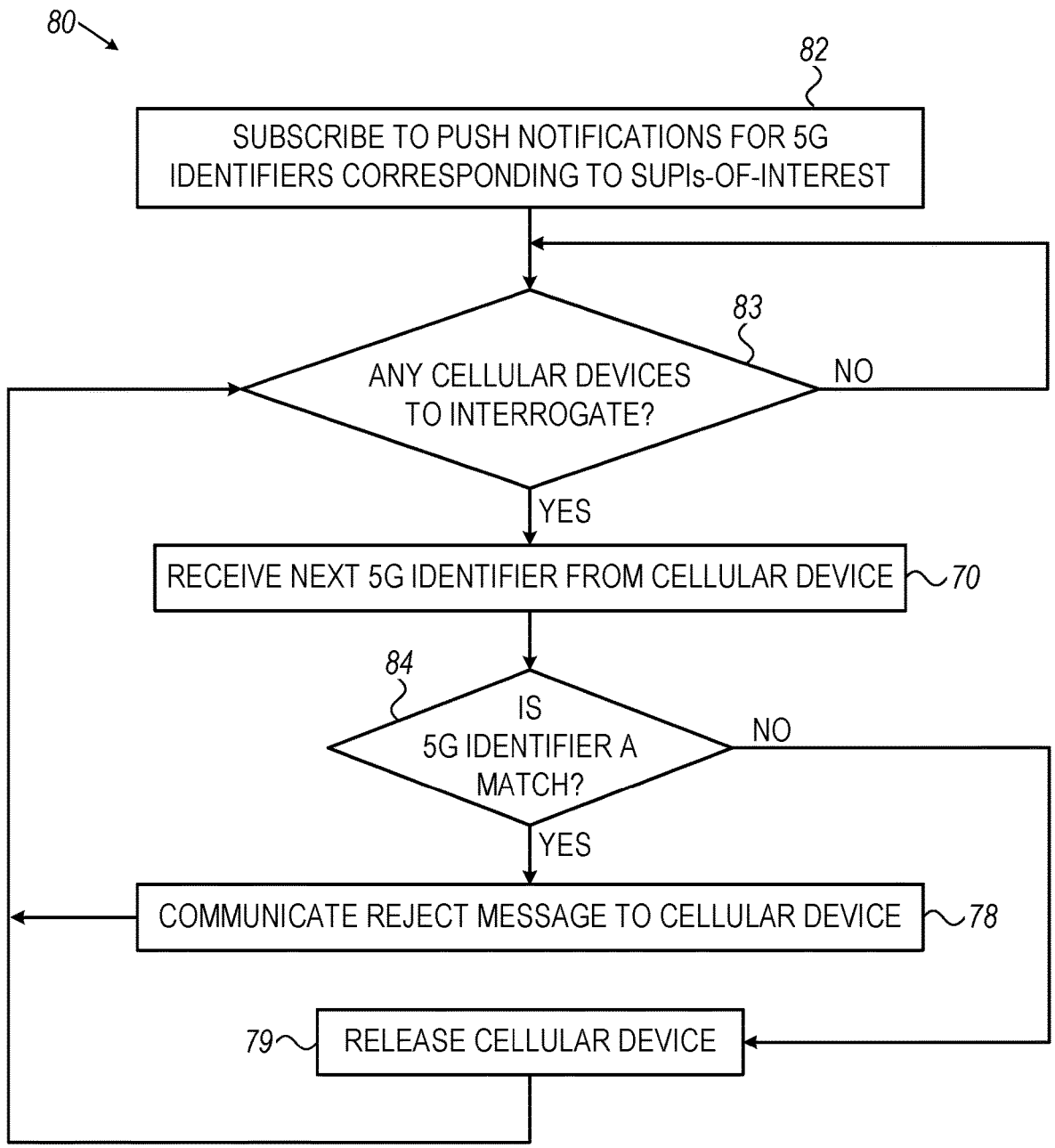

Reference is now made to FIG. 4, which is a flow diagram for an alternative algorithm 80 for interrogating cellular devices, in accordance with some embodiments of the present disclosure. Algorithm 80 may be executed by the processor of any interrogation device at any suitable location, following the ascertainment of one or more SUPIs-of-interest, e.g., using technique 59 (FIG. 2).

Algorithm 80 begins with a second querying step 82, at which the processor submits, to the 5G core network, a query including a subscription to push notifications of respective other 5G identifiers corresponding to one or more SUPIs-of-interest. Subsequently to submitting the query, the processor begins receiving the push notifications.

Subsequently, the processor begins interrogating cellular devices. In particular, the processor repeatedly checks, at a second checking step 83, whether any cellular devices have associated with a 5G imitation BTS and are thus ready for interrogation. The processor interrogates each such device, receiving a 5G identifier of the device at identifier-receiving step 70. Subsequently to receiving the 5G identifier from the device, the processor checks, at a third checking step 84, whether the 5G identifier received from the device matches any of the corresponding other 5G identifiers received in the push notifications. If yes, the processor performs rejecting step 78, thus causing the device to register with a transceiver imitating a lower-generation BTS. Otherwise, the processor releases the device at releasing step 79. Subsequently to rejecting step 78 or releasing step 79, the processor returns to second checking step 83.

It is noted that in parallel to algorithm 68 (FIG. 3) or algorithm 80, the processor may execute a separate algorithm for advanced interrogation and/or interception of any device associated with a lower-generation imitation BTS.

It will be appreciated by persons skilled in the art that the present invention is not limited to what has been particularly shown and described hereinabove. Rather, the scope of embodiments of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system, comprising:
  a first transceiver, configured to imitate a 5th generation (5G) base transceiver station (BTS) belonging to a 5G cellular network;
  a second transceiver, configured to imitate a lower-generation BTS belonging to a lower-generation cellular network; and
  a processor, configured to:
    cause a cellular device associated with the 5G cellular network to communicate a first other 5G identifier used by the device to identify itself, to any transceiver while a person-of-interest (POI) and the cellular device are at a first location;
    cause the cellular device to communicate a second other 5G identifier to any transceiver while the POI and the cellular device are at a second location;
    transmit the first other 5G identifier and the second other 5G identifier used by the device to identify itself, to a core network of the 5G cellular network via a lawful-interception (LI) communication interface of the core network;
    receive, from the LI, a corresponding Subscription Permanent Identifier (SUPI) to both the first other 5G identifier and the second other 5G identifier used by the device to identify itself;
    ascertain that the SUPI corresponds both to the first other 5G identifier and to the second other 5G identifier; and
    cause the cellular device to register with the second transceiver in response to ascertaining that the SUPI corresponds both to the first other 5G identifier and to the second other 5G identifier.

2. The system according to claim 1, wherein the processor is further configured to, subsequently to causing the cellular device to register with the second transceiver, perform man-in-the-middle (MITM) intermediation of communication exchanged with the cellular device.

3. The system according to claim 1, wherein the processor is further configured to, subsequently to causing the cellular device to register with the second transceiver, cause the cellular device to behave as a beacon.

4. The system according to claim 1, wherein the processor is further configured to:
  receive one or more other 5G identifiers from different respective other cellular devices,
  by communicating the other 5G identifiers to the core network, ascertain one or more other SUPIs corresponding to the other 5G identifiers, respectively, and
  store an association between the other 5G identifiers and the other SUPIs, respectively.

5. The system according to claim 1, wherein the 5G identifier includes a Global Unique Temporary Identifier (GUTI).

6. The system according to claim 1, wherein the 5G identifier includes a Subscription Concealed Identifier (SUCI).

7. The system according to claim 1, wherein the processor is configured to cause the cellular device to register with the second transceiver by communicating, to the cellular device, a message selected from the group of messages consisting of: a REGISTRATION REJECT message and a SERVICE REJECT message.

8. A method, comprising:
  using a first transceiver imitating a 5th generation (5G) base transceiver station (BTS) belonging to a 5G cellular network;
  causing a cellular device associated with the 5G cellular network to communicate, to the first transceiver, a first 5G identifier used by the device to identify itself, in a first correspondence between the first transceiver and the cellular device, while a person-of-interest (POI) and the cellular device are at a first location;
  transmitting to a core network of the 5G cellular network via a lawful-interception (LI) communication interface of the core network, the first 5G identifier used by the device to identify itself;
  receiving, from the LI, a corresponding Subscription Permanent Identifier (SUPI) to the first 5G identifier used by the device to identify itself;
  causing the cellular device to communicate a second 5G identifier to any transceiver while the POI and the cellular device are at a second location;
  communicating the second 5G identifier to the core network, ascertaining a second correspondence between the second 5G identifier and the SUPI;

causing the cellular device to register with a second transceiver imitating a lower-generation BTS belonging to a lower-generation cellular network in response to the SUPI being included in a predefined list of SUPIs, wherein causing the cellular device to register with the second transceiver comprises causing the cellular device to register with the second transceiver in response to the SUPI corresponding both to the first 5G identifier and to the second 5G identifier.

9. The method according to claim 8, further comprising, subsequently to causing the cellular device to register with the second transceiver, performing man-in-the-middle (MITM) intermediation of communication exchanged with the cellular device.

10. The method according to claim 8, further comprising, subsequently to causing the cellular device to register with the second transceiver, causing the cellular device to behave as a beacon.

11. The method according to claim 8, further comprising:
receiving one or more other 5G identifiers from different respective other cellular devices;
by communicating the other 5G identifiers to the core network, ascertaining one or more other SUPIs corresponding to the other 5G identifiers, respectively; and
storing an association between the other 5G identifiers and the other SUPIs, respectively.

12. A system, comprising:
a first transceiver, configured to imitate a 5th generation (5G) base transceiver station (BTS) belonging to a 5G cellular network;
a second transceiver, configured to imitate a lower-generation BTS belonging to a lower-generation cellular network; and
a processor, configured to:
communicate a Subscription Permanent Identifier (SUPI) of interest to a core network with a subscription for push notifications of 5G identifiers corresponding to the SUPI of interest via a lawful-interception (LI) communication interface;
receive from the core network the 5G identifier associated with the SUPI of interest via the LI communication interface;
cause a cellular device associated with the 5G cellular network to communicate to the first transceiver, a 5G identifier associated with the device to identify itself;
determine if there is a match between the 5G identifier associated with the SUPI of interest with the 5G identifier associated with the device to identify itself;
cause the cellular device to register with the second transceiver in response to a match of the 5G identifiers.

* * * * *